United States Patent [19]

Tanaka

[11] Patent Number: 4,764,783

[45] Date of Patent: Aug. 16, 1988

[54] LENS FOCUSING POSITION ADJUSTING MECHANISM

[75] Inventor: Hitoshi Tanaka, Tokyo, Japan

[73] Assignee: Asahi Kogaku Kogyo Kabushiki Kaisha, Tokyo, Japan

[21] Appl. No.: 113,952

[22] Filed: Oct. 29, 1987

[30] Foreign Application Priority Data

Oct. 29, 1986 [JP] Japan ............................. 61-165959[U]

[51] Int. Cl.⁴ ............................. G02B 7/04; G03B 3/00
[52] U.S. Cl. ..................................... 354/195.1; 350/255
[58] Field of Search ............... 354/195.1, 195.12, 286; 350/255

[56] References Cited

U.S. PATENT DOCUMENTS

| | | | |
|---|---|---|---|
| 4,309,077 | 1/1982 | Tomori | 354/195.1 |
| 4,340,280 | 7/1982 | Isobe | 350/255 |
| 4,411,498 | 10/1983 | Muryoi | 350/255 |

Primary Examiner—A. A. Mathews
Attorney, Agent, or Firm—Sughrue, Mion, Zinn, Macpeak & Seas

[57] ABSTRACT

An improved lens focusing position adjusting mechanism in which the focusing position is adjusted by changing the relative coupling position, in a circumferential direction, of a focusing ring and a drive ring fitted in the focusing lens and moved together with the focusing lens to drive a lens system. A circumferential groove is formed in the engaging surface of the drive ring or focusing ring, an adjustment belt is inserted in the groove, and the adjusting belt is positioned with respect to the focusing ring and tightened to the outer wall of the drive ring to combine the drive ring and the focusing ring into a single unit.

2 Claims, 1 Drawing Sheet

LENS FOCUSING POSITION ADJUSTING MECHANISM

BACKGROUND OF THE INVENTION

The present invention relates to a focusing position adjusting mechanism for an interchangeable lens barrel of a type used primarily for single-lens reflex cameras.

A variety of focusing position adjusting mechanisms used in interchangeable lens barrels have been proposed, differing in design according to the type of lens drive systems. In a lens of a type in which focusing adjustment is carried out by adjusting the position of a focusing lens, the lens drive member is composed of a first member including a stopper member for regulating the infinity photographing position and the closest photographing position, and a second member having a helicoid and cam hole for driving the lens. The force of engagement between the first and second member is decreased to change the relative positions thereof in a circumferential direction to thereby adjust the focusing position. After adjustment, the force of engagement is decreased again, and the members are fixed.

When, in the above-described conventional mechanism, the members are fixed after adjustment, the members are deformed slightly, lowered especially in circularity, as a result of which it becomes difficult to smoothly move the focusing lens. In order to eliminate this difficulty, the two drive members must be increased in mechanical strength. Furthermore, in order to minimize the application of a radial load to the members, the structure of the mechanism must be such that the members are tightened thrustwise by a tightening force. Therefore, the conventional mechanism has little degree of freedom in design, and is a cause of the lens barrel being bulky.

SUMMARY OF THE INVENTION

In view of the foregoing, an object of the present invention is to provide a focusing position adjusting mechanism which does not adversely affect the driving of the focusing system and which permits the effective use of the space available in the lens system to achieve a focusing position adjusting operation with high reliability.

The foregoing object of the invention has been achieved by the provision of a lens focusing position adjusting mechanism in which the focusing position is adjusted by changing the relative coupling position, in a circumferential direction, of a focusing ring and a drive ring which is fitted in the focusing ring and is moved together with the focusing ring to drive a lens system, in which, according to the invention, a circumferential groove is formed in the engaging surface of the drive ring or focusing ring, an adjusting belt is inserted in the groove, and the adjusting belt is positioned with respect to the focusing ring and tightened to the outer wall of the drive ring to combine the drive ring and the focusing ring into one unit.

DESCRIPTION OF THE PREFERRED EMBODIMENTS

A preferred embodiment of the invention will be described with reference to the accompanying drawings.

Figure 1:
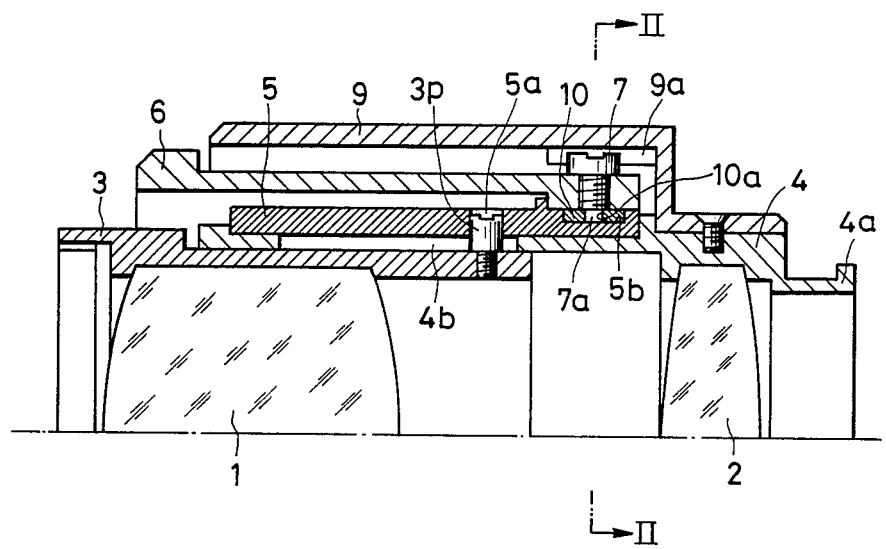
FIG. 1 is a longitudinal sectional view showing essential components of an example of a single-lens reflex camera interchangeable lens with a focusing position adjusting mechanism according to the invention.
Figure 2:
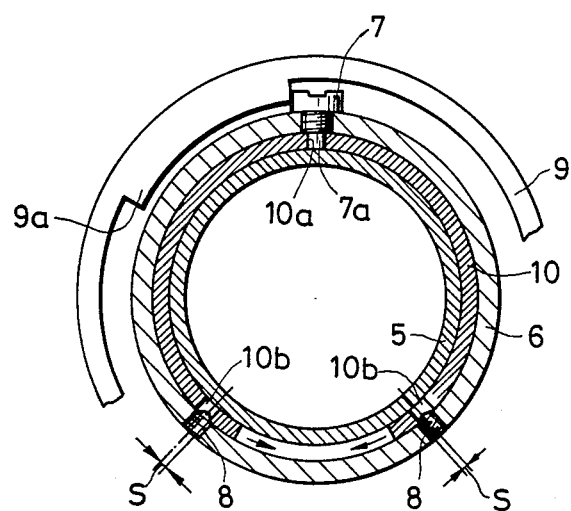
FIG. 2 is a sectional view taken along a line II—II in FIG. 1.

FIG. 1 is a longitudinal sectional view showing essential components of an example of a single-lens reflex camera interchangeable lens having a focusing position adjusting mechanism constructed according to the invention. FIG. 2 is a cross-sectional view showing essential components of the focusing position adjusting mechanism.

The interchangeable lens has a focusing lens system 1 and an image-forming lens system 2. The focusing lens system 1 is fixedly held by a movable frame 3, which is movable along the optical axis, and the image-forming lens system 2 is fixedly secured to a lens barrel body 4. Reference numeral 4a designates a mount part formed at the rear end of the lens barrel body 4. The mount part 4a is engaged with a mount on the camera body.

The movable frame 3, which is fitted in the lens barrel body 4, has a guide pin 3p embedded in its cylindrical outer wall. The guide pin 3p is engaged with a straight guide groove 4b formed in the lens barrel body 4 in such a manner that the groove 4b extends parallel to the optical axis. The movable frame 3 is then movable along the straight guide groove 4b.

A drive ring 5 is fitted on the lens barrel body 4 in such a manner that the ring 5 is rotatable around the optical axis but not movable in the direction of the optical axis. A lead groove 5a is cut in the drive ring 5 extending obliquely with respect to the optical axis. Furthermore, an angular groove 5b is cut in the drive ring 5 extending circumferentially. The guide pin 3p, extending through the straight guide groove 4b, is engaged with the lead groove 5a. A flexible adjusting belt 10, which is one of the specific features of the invention, is fitted in the angular groove 5b.

A focusing ring 6 is fitted on the drive ring in such a manner that it is rotatable around the optical axis. A limit screw 7 and two set screws 8 are screwed into the focusing ring 6. These screws 7 and 8 are on a circumference whose center coincides with the center of the angular groove 5b. The screw 7 is located at the top of the ring 6 and the screws 8 are located symmetrically, right and left, on the lower portion of the ring, as shown in FIG. 2. The limit screw 7 has a positioning part 7a at its end. The positioning part 7a is engaged with a positioning hole 10a formed in the central portion of the adjusting belt 10. Tightening holes 10b and 10b are formed in both end portions of the adjusting belt 10 in such a manner that the tightening holes are at a distance s from the center of the respective set screws 8. The distance s is determined so that the conical ends of the set screws 8 abut the edges of the tightening holes 10b first, and when the set screws 8 are screwed deeply into the tightening holes 10b, a tensile force is applied to the adjusting belt 10.

The focusing ring 6 is covered by an outer frame 9 secured to the body 4 with screws. A rotational range limiting protrusion 9a is formed on the inner surface of the outer frame 9. The limiting protrusion 9a abuts the limit pin 7 embedded in the focusing ring 6 so that the rotation of the focusing ring is limited between the infinity photographing position and the closet photographing position.

The focusing adjustment of the lens barrel thus constructed is carried out manufacture and during assembly as follows: The adjusting belt 10 is combined with the focusing ring 6 with the positioning part 7a of the limit screw 7 engaged with the positioning hole 10a. That is, the belt 10 is positioned with respect to the focusing ring 6. A small gap is provided between the end of the positioning part 7a and the bottom of the angular groove 5b so that the limit screw 7 cannot disturb the relative rotation of the focusing ring 6 and the drive ring 5.

As the set screws 8 held as shown in FIG. 2 are screwed into the holes 10b, the edges of holes 10b are pushed by the conical end parts of the set screws 8. As a result, the belt 10 is pulled in the directions of the arrows with the conical end parts as wedges. As a result, the drive ring 5, being tightened on the principle of a band brake, is frictionally combined with the focusing ring 6 so that the rings 5 and 6 can turn as one unit.

For focusing position adjustment, first under the condition that the set screws 8 have been loosened, the drive ring 5 and the focusing ring 6 are turned relative to each other to obtain a correct focusing position. Under this condition, the set screws 8 are tightened to combine the drive ring 5 and the focusing ring 6 together. Thus, the focusing adjustment and the combination of the rings 5 and 6 into one unit have been accomplished.

Since, after the combination of the rings 5 and 6, the latter is turned to focus the lens on an object during ordinary photographing operations, the drive ring coupled through the adjusting belt to the focusing ring 6 is turned, and hence, through the cooperation of the lead groove 5a and the straight guide groove 4b, the guide pin 3p is moved along the straight guide groove 4b, and accordingly the focusing lens system 1 held by the movable frame 3 is moved along the optical axis. Thus, the lens is focused on the object.

In the above-described embodiment, the angular groove 5b is formed in the outer wall of the drive ring 5. However, the groove 5b may be formed in the inner wall of the focusing ring 6.

As is apparent from the above description, in the focusing position adjusting mechanism according to the invention, an adjusting belt made of a belt-shaped material is employed to combine the focusing ring and the drive ring for driving the lens, and the drive ring and focusing ring are combined together on the principle of a band brake after the focusing position adjustment has been accomplished. Therefore, the tightening load is not concentrated but distributed over the entire circumference. Accordingly, the focusing ring and the drive ring are combined together without deforming the rotary members used in the focusing operation. Furthermore, the focusing position adjusting mechanism of the invention requries only the space necessary to accommodate the adjusting belt. This increases the degree of freedom in the design of the lens system. Furthermore, the adjusting belt can be positioned and fixed with the screw and can be tightened by turning the screws. Thus, the focusing position adjusting mechanism needs only a small number of components and is simple in construction, and therefore the lens can be assembled with ease.

What is claimed is:

1. In a lens focusing position adjusting mechanism in which a focusing position is adjusted by changing the relative coupling position, in a circumferential direction, of a focusing ring and a drive ring fitted in said focusing lens and moved together with said focusing lens to drive a lens system, the improvement wherein:
    a circumferential groove is formed in an engaging surface of one of said drive ring and said focusing ring;
    an adjusting belt is inserted in said groove; and
    said adjusting belt is fixedly positioned with respect to said focusing ring and tightened to the outer wall of said drive ring to combine said drive ring and said focusing ring into one unit.

2. The lens focusing position adjusting mechanism as claimed in claim 1, wherein said adjusting belt has a positioning hole formed substantially in a middle portion thereof which is used for postioning said belt to said focusing ring, and tightening holes in both end portions thereof which are engaged with conical end portions of set screws screwed into said focusing ring, and the centers of said screws are displaced from the centers of the respective ones of said tightening holes so that as said set screws are screwed in, a tensile force is applied to said adjusting belt.

* * * * *